(12) United States Patent
Marik

(10) Patent No.: US 6,981,165 B2
(45) Date of Patent: Dec. 27, 2005

(54) METHOD AND APPARATUS FOR HANDLING AN INTERRUPT FROM A REAL-TIME CLOCK TO INCREMENT A PROGRAM CLOCK

(75) Inventor: Mark D. Marik, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 10/233,731

(22) Filed: Sep. 3, 2002

(65) Prior Publication Data

US 2004/0044924 A1    Mar. 4, 2004

(51) Int. Cl.[7] .............................. G06F 1/12; G06F 1/14
(52) U.S. Cl. ....................................... 713/401; 713/400
(58) Field of Search ................................ 713/400, 401

(56) References Cited

U.S. PATENT DOCUMENTS

| | | | |
|---|---|---|---|
| 5,617,544 A * | 4/1997 | Tulpule et al. .............. 710/100 |
| 5,805,870 A | 9/1998 | Browning ................... 395/553 |
| 5,845,060 A | 12/1998 | Vrba et al. ............... 395/182.1 |
| 5,857,085 A | 1/1999 | Zhang et al. ............... 395/309 |
| 6,295,254 B1 * | 9/2001 | Tomishima .............. 369/44.28 |
| 6,324,598 B1 * | 11/2001 | Olson et al. .................. 710/24 |
| 6,728,890 B1 * | 4/2004 | Mirov et al. ............... 710/107 |

OTHER PUBLICATIONS

TDB: Hardware Support for an Operating System Timer, pp. 237-238, Mar. 1992.

INTEL: 82C54 CHMOS Programmable Interval Timer, Order No. 231244-006, pp. 1-18, Oct. 1994.

John P. Hayes, Computer Architecture and Organization 2nd Edition, 1988, pp. 506-533.

* cited by examiner

Primary Examiner—Thuan Du
Assistant Examiner—Anand B. Patel
(74) Attorney, Agent, or Firm—William A. Kinnaman, Jr.

(57) ABSTRACT

A method and apparatus for handling an interrupt from a real-time clock to increment a program clock in a computer system while compensating for missed interrupts due to contention on a system bus from a DMA controller or the like. In accordance with the invention, a count is stored representing a cumulative interval of time that has elapsed without a corresponding incrementing of the program clock. In response to an interrupt from the real-time clock, the processor transfers control to an interrupt handling routine, which determines the interval of time that has elapsed since the previous real-time clock interrupt and increments the cumulative interval of time by the actual interval of time that has elapsed since the previous real-time clock interrupt. If the cumulative interval of time is greater than an expected interval of time between real-time clock interrupts, the interrupt handling routine iteratively increments the program clock and decrements the cumulative interval of time to reflect incrementing of the program clock until the cumulative interval of time is less than the expected interval of time between real-time clock interrupts.

20 Claims, 6 Drawing Sheets

METHOD AND APPARATUS FOR HANDLING AN INTERRUPT FROM A REAL-TIME CLOCK TO INCREMENT A PROGRAM CLOCK

BACKGROUND OF THE INVENTION

1. Field of the Invention

This invention relates to a method and apparatus for handling an interrupt from a real-time clock to increment a program clock in a computer system. More particularly, it relates to such a method and apparatus that compensates for time drift due to missed interrupts caused by contention on a system bus from a DMA controller or the like.

2. Description of the Related Art

Computer systems commonly have a real-time clock (RTC), a hardware component that is coupled to a central processing unit (CPU) of the system via a peripheral bus. Usually the RTC and other peripheral devices are coupled to the peripheral bus through an interrupt controller. The RTC is used to update a program clock, typically a date/time clock maintained by the operating system (OS) and referred to herein as the OS clock. Periodically, the RTC generates an interrupt signal on its line to the interrupt controller, which in turn generates a signal on an interrupt line to the CPU as well as a multibit vector on the peripheral bus identifying the RTC as the source of the interrupt. In response to the RTC interrupt, the CPU transfers control to an interrupt handling routine specific to the RTC interrupt, which increments the OS clock, then resumes the previous thread of execution at the point of the interrupt.

Also coupled to the peripheral bus in such systems is a direct memory access (DMA) controller, a hardware component that performs data transfers between memory and peripheral devices without requiring the intermediation of the CPU. To perform such data transfers, the DMA controller negotiates with the CPU to gain control of the peripheral bus as a bus master, to the exclusion of the CPU, for the duration of the DMA transfer.

During such DMA transfers, the RTC is unable to communicate with the CPU, since the CPU does not have control of the peripheral bus. As a result, RTC interrupts will be missed, and the OS clock will gradually lose time relative to the RTC.

The problem has existed since the introduction of Intel-based personal computers in the early 1980s. Others have addressed the problem by periodically resynchronizing the OS clock with the RTC time. This approach, however, has problems of its own. For one, the time drift between resynchronizations accumulates such that the OS time just before any given "resync" with the RTC may be seconds less than the actual time. Then, after resync, the OS time will jump suddenly to the RTC time, which has a one-second resolution. Even if the actual drift of the OS clock is only a fraction of a second, the act of resynchronizing with the RTC will eliminate the fractional portion of the second that the OS keeps track of, because of the one-second resolution of the RTC clock. Moreover, periodically synchronizing the OS clock with the RTC requires CPU cycles, which can detract from other important work.

SUMMARY OF THE INVENTION

In general, the present invention contemplates a method and apparatus for handling an interrupt from a real-time clock to increment a program clock in a computer system while compensating for missed interrupts due to contention on a system bus from a DMA controller or the like. In accordance with the invention, a count is stored representing a cumulative interval of time that has elapsed without a corresponding incrementing of the program clock. In response to an interrupt from the real-time clock, the CPU or other processor transfers control to an interrupt handling routine, which determines the actual interval of time that has elapsed since the previous real-time clock interrupt and increments the cumulative interval of time by the actual interval of time that has elapsed since the previous real-time clock interrupt. If the cumulative interval of time is greater than an expected interval of time between real-time clock interrupts, the interrupt handling routine iteratively increments the program clock and decrements the cumulative interval of time to reflect incrementing of the program clock until the cumulative interval of time is less than the expected interval of time between real-time clock interrupts.

DESCRIPTION OF THE PREFERRED EMBODIMENT

Figure 1:
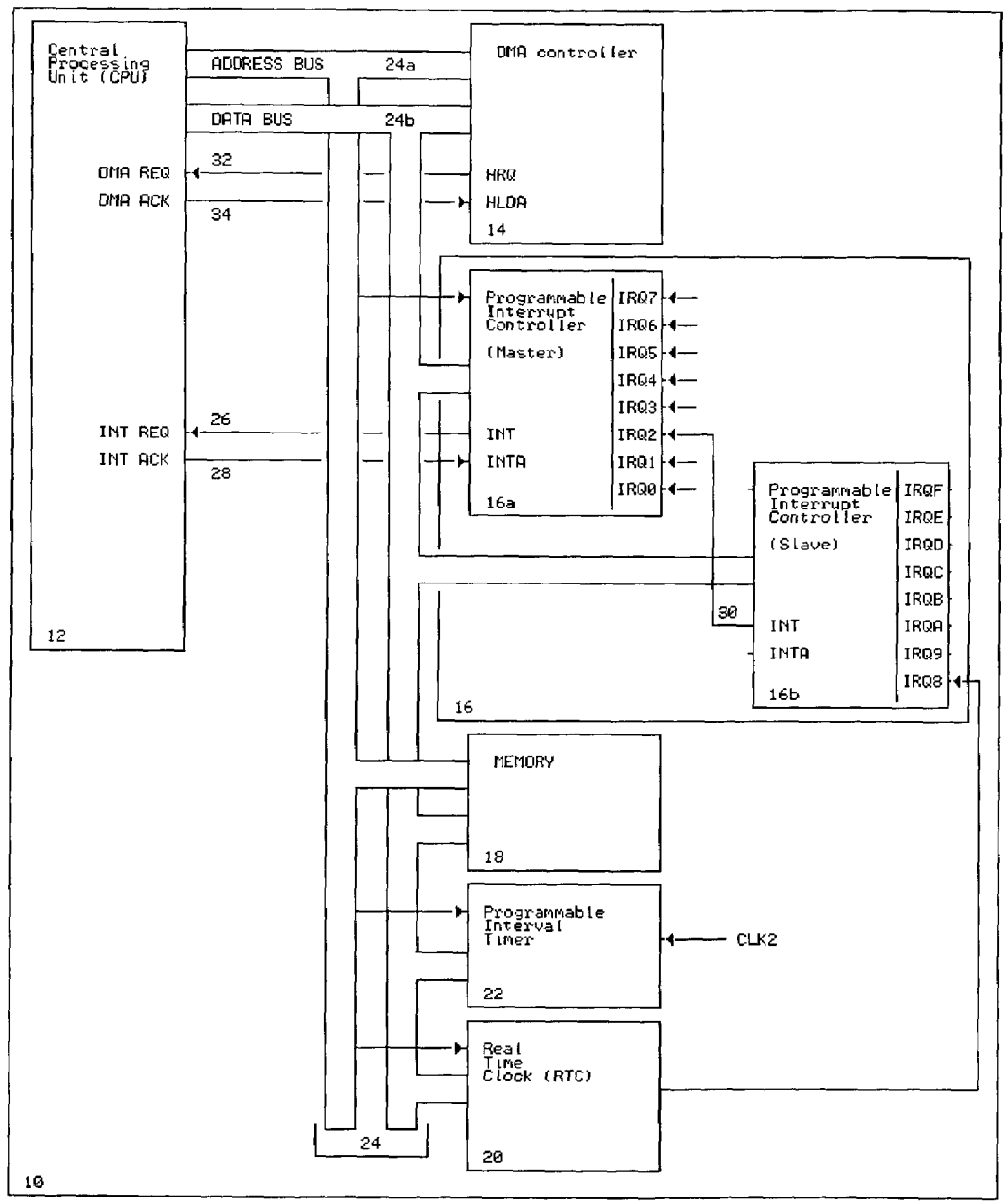
FIG. 1 is a block diagram of a computer system incorporating the present invention.

The present invention uses software means to eradicate nonlinear time drift caused by missed RTC timer tick interrupts due to DMA activity. In a preferred embodiment, described below, it makes use of a high-resolution timer of a programmable interval timer in rate generation mode to determine whether an RTC timer tick interrupt has been missed and by how much time it was missed. The present invention then compensates for missed RTC timer tick interrupts immediately upon detection, by incrementing the total tick count and adjusting the time and date of the OS clock accordingly. (The terms "increment" and "decrement" as used herein should be understood as referring to the real-world value represented by a count, and not necessarily the indexing operation actually performed in a computer implementation.)

In the preferred embodiment, the software means comprises two routines that are executed by the processor handling the RTC timer tick interrupts. These two routines are made part of the overall interrupt handling routine for RTC timer ticks. One routine, called the front-end calculation routine, is executed prior to the existing routine (also referred to herein as the "core" routine or the "update" routine) for RTC timer tick interrupt handling, as a preprocessing step. The other routine, called the back-end calculation routine, is executed immediately after the existing routine for RTC timer tick interrupt handling, as a postprocessing step.

The front-end calculation routine first initializes the high-resolution timer. Once this is done, the front-end calculation routine calculates a variable "deltaTime". This variable indicates the number of high-resolution timer ticks which have elapsed in the timer interval between the previous and current RTC timer tick interrupt services. The embodiment described uses an algorithm in which the high-resolution timer counts down before reload. The algorithm can be easily modified, however, to use high-resolution timers which count up.

The operating system's existing RTC timer tick interrupt handling remains unchanged and is responsible for time and date updates.

The back-end calculation routine uses the deltaTime obtained in the front-end calculation routine, and the deltaRem from a previous back-end calculation routine invocation, to determine whether an immediate reiteration of the update routine is required to update the OS time and date.

The value deltaRem represents a high-resolution timer tick count which by definition is less than deltaAve, where deltaAve is the mathematically calculated number of high-resolution timer ticks representing the time interval between RTC timer tick interrupts under perfect conditions where no other bus master arbitrates for the address and data bus. The value deltaRem is the remaining high-resolution timer tick count after successive subtractions of deltaTime from deltaAve until the remainder is less than deltaAve. The relationship between deltaTime, deltaRem, and deltaAve will become more evident in the discussion of the algorithm that follows.

A single additional iteration of the update routine in a given RTC timer tick interrupt service is performed before exiting the interrupt service if deltaTime plus any remainder deltaRem from a previous RTC interrupt service routine is at least twice but less than three times the size of deltaAve. Multiple additional iterations of the update routine in a given RTC timer tick interrupt service are performed before exiting the interrupt service if deltaTime plus any remainder deltaRem from a previous RTC interrupt service routine is three or more times the size of deltaAve.

FIG. 1 shows a computer system 10 incorporating the present invention. Computer system 10 may be a freestanding machine such as a personal computer (PC), a card that fits into a slot provided on such a machine, or an embedded processor, among other possibilities. As shown in the figure, such a computer system 10 includes a central processing unit (CPU) 12; a direct memory access (DMA) controller 14; a programmable interrupt controller 16 (made up of a master controller 16*a* and slave controller 16*b*); memory 18 (static or dynamic); a real-time clock (RTC) 20; and a programmable interval timer 22. CPU 12 may be an Intel-architecture processor such as an Intel Pentium or Itanium processor or any other suitable processor known to the art. Components 12–22 are coupled to one another by means of a peripheral bus 24, as it is commonly termed, comprising an address bus 24*a* and a data bus 24*b*. Peripheral bus 24 may be an ISA, EISA, PCI, or VESA bus, among other possibilities. Peripheral bus 24 may have still other peripheral components attached, such as I/O device adapters of various types, but they are not necessary to the operation of the present invention and are therefore not shown.

Components 12–24 may exist within a single physical entity such as a very large-scale integrated (VLSI) circuit or an application-specific integrated circuit (ASIC). Commonly, ASIC and VLSI chips containing these components may emulate older Intel components found in "legacy" computers such as IBM XT and AT PCs. For example, a DMA controller may emulate the Intel 8237 DMA controller, a programmable interval timer may emulate either the Intel 8253 interval timer or the Intel 8254 interval timer which is a superset of the 8253 timer, and a programmable interrupt controller may emulate the Intel 8259 interrupt controller. The present invention does not depend on the type of components used or the type of peripheral bus used. However, a preferred implementation uses an ASIC that uses an ISA peripheral bus and emulates the Intel 8237 DMA controller, the Intel 8259 interrupt controller (for both the master and slave controllers), and the Intel 8253 or 8254 interval timer.

Figure 5:
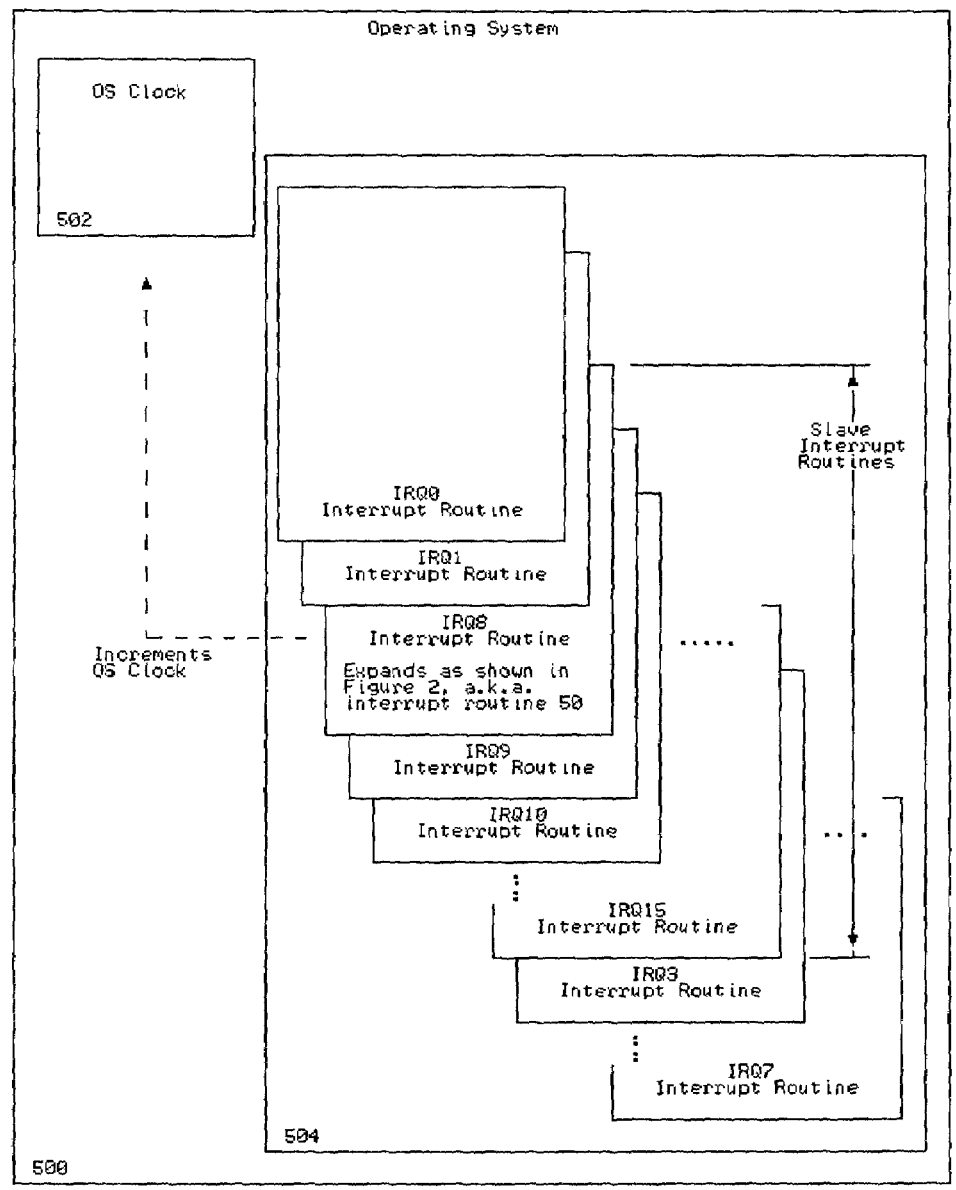
FIG. 5 shows the components of the operating system that are relevant to the present invention.

Executing on CPU 12, in addition to any applications (not shown), is an operating system (OS) 500 (FIG. 5). OS 500 may be any suitable operating system known to the art, such as a Microsoft Windows OS, a Linux or other UNIX OS, or the like. The functioning of an operating system to manage system resources and perform system services is well known in the art and will therefore not be discussed here. Of interest to the present invention, however, is that OS 500 contains a software OS clock 502 and one or more interrupt handling routines 504. OS clock 502 may be a set of one or more registers, a location in memory 18, or any other suitable program-accessible location for storing a date/time value that is updated as described below. Interrupt handling routines 504, or interrupt handlers for short, are invoked in response to interrupts received from peripheral devices, also as described below.

As noted above, in the embodiment shown, programmable interrupt controller 16 is made up of a master programmable interrupt controller 16*a* and a slave programmable interrupt controller 16*b*. Master controller 16*a* receives a plurality of interrupt inputs IRQ0–IRQ7 from various devices, including slave controller 16*b* on IRQ2, and interfaces with CPU 12 via an interrupt request line 26 (INT) and an interrupt acknowledge line 28 (INTA). Similarly, slave controller 16*b* receives a plurality of interrupt inputs IRQ8–IRQ15 from various devices, including real-time clock 20 on IRQ8, and interfaces with master controller 16*a* via an interrupt request line 30 (INT). Although not shown in FIG. 1, slave controller 16*b* also interfaces with CPU 12 via an INTA output coupled to line 28. Both the master controller 16*a* and the slave controller 16*b* are also coupled to the data bus 24*b*.

To request an interrupt, a peripheral device generates an interrupt signal on the interrupt line IRQi to which it is coupled. If the peripheral device is coupled to the master controller 16*a*, that controller generates an interrupt signal on line 26 to CPU 12. If the peripheral device is coupled to the slave controller 16*b*, that controller generates an interrupt signal on line 30 to master controller 16*a*, which in turn generates an interrupt signal on line 26 to CPU 12. CPU 12 responds to the interrupt signal on line 26 by successively generating two acknowledge (ACK) signals on line 28.

In response to the first ACK signal from CPU 12, the controller 16*a* or 16*b* receiving the original interrupt (slave controller 16*b* if line IRQ2 was actuated, master controller 16*a* otherwise) freezes the state of its inputs for priority resolution. In response to the second ACK signal from CPU 12, the controller 16*a* or 16*b* receiving the original interrupt places a byte (8 bits) of data on the data bus 24*b*. Of these 8 bits, the least significant 3 bits decode to the eight IRQ lines IRQ0–IRQ7 or IRQ8–IRQF and represent bits A2–A0 of a vector address A15–A0, while the most significant 5 bits (different for the two controllers 16*a* and 16*b* and programmed into the controllers at initialization time) represent vector address bits A15–A11. CPU 12 uses these 8 bits of data (along with bits A10–A3 originating from the CPU itself) to build the vector address A15–A0. CPU 12 then branches to this vector address to begin execution of a corresponding interrupt handling routine 504 for servicing the interrupt. Upon completion of the interrupt handling routine 504, CPU 12 resumes normal program execution at the point where it left off. All of this is conventional in the art and is described merely for the purpose of providing background information.

Real-time clock (RTC) 20 periodically generates a "tick" on interrupt line IRQ8 to slave controller 16b to indicate that the OS clock 502 should be incremented. In response to this tick, slave controller 16b operates as described above to generate an interrupt signal on line 30 to master controller 16a, which in turn generates an interrupt signal on line 26 to CPU 12. CPU 12 responds to the interrupt signal on line 26 to obtain bits of a vector address from the data bus 24b and transfer control to a corresponding interrupt handling routine 504, which increments the OS clock 502 by an appropriate amount. In the embodiment shown, in which the RTC tick rate is 128 Hz, the OS clock 502 is incremented by $\frac{1}{128}$ second, or 7.8125 milliseconds (ms).

Programmable interval timer 22 may operate as described in the Intel publication 82C54 CHMOS Programmable Interval Timer, order number 231244-006 (October 1994), incorporated herein by reference. As described in that publication, programmable interval timer 22 contains three separate 16-bit timers (0, 1 and 2), each of which may be programmed to operate in any one of a number of modes. In the mode that is of interest to the present invention, one of the individual timers (timer 2 in the embodiment shown) is operable in a so-called "rate generator" mode (also referred to herein as mode 2). In this mode, and in response to an external clock signal CLK2, timer 2 repeatedly counts down from an initial count of N to a final count of one, at which point it generates an output pulse and reloads the initial count to start the process anew, repeating the process every N pulses, or ticks, of the clock signal CLK2.

In the embodiment shown, the output pulse from timer 2 is not itself used. Rather, timer 2 is read at appropriate times over the peripheral bus 24 by supplying a suitable read signal (as described in the publication referenced above) from CPU 12 to the programmable interval timer 22. Also in the embodiment shown, the initial count N is set to be $2^{16}$, the largest possible initial count, represented in the 16-bit counter as all zeros. Timer 2 thus repeats the process of counting down from its initial count of $2^{16}$ every $2^{16}$ ticks of the clock signal CLK2. In the embodiment shown, as described below, timer 2 is clocked at a CLK2 "tick" rate of 1.1892 MHz.

With respect to the above discussion, it should be noted that if CPU 12 interprets all zeros as signifying zero rather than $2^{16}$, then timer 2 will appear to the CPU to count down from $2^{16}-1$ to zero rather than from $2^{16}$ to one. Whether CPU 12 interprets the count one way or the other makes no difference to the operation of the invention.

Although the disclosed embodiment uses a separate hardware element 20 for an RTC, it is also possible to simulate an RTC running at an appropriate tick frequency (128 Hz in the embodiment shown) by using one of the other timers of the programmable interval timer block 22 to interrupt CPU 12 after an appropriate number of ticks of that other timer. This may be done, for example, by operating timer 0 of programmable interval timer 22 in square wave mode (mode 3 of the Intel time referenced above), loading it with an appropriate initial count (e.g., 9291 if a 1.1892 MHz clock signal is used as for timer 2) and coupling its output to interrupt line IRQ0 of the master interrupt controller 16a. In this case, the interrupt routine 504 that updates the OS clock 502 would be located at an address appropriate to IRQ0.

DMA controller 14 controls transfers of data between memory 18 and a peripheral device over the peripheral bus 24. As is conventional in the art, DMA controller 14 performs these transfers without the intermediation of CPU 12, thereby freeing the CPU to perform other operations. To perform such data transfers, DMA controller 14 must gain control of the peripheral bus 24 (i.e., act as a bus master) to the exclusion of CPU 12. To obtain this control, DMA controller 14 generates a DMA request signal on a DMA request line 32 to CPU 12. CPU 12 in turn signals that it ready to relinquish such control by generating an acknowledge signal on a DMA acknowledge 34 line to DMA controller 14. When it has completed its data transfer operation, DMA controller 14 returns control of the bus 24 to CPU 12 by removing the request signal from DMA request line 32. CPU 12 in turn acknowledges this by removing the ACK signal from line 34.

While DMA controller 14 has control of the peripheral bus 24, CPU 12 may miss interrupts from RTC 20 because of contention on the bus. The present invention is designed to compensate for these missed interrupts.

Figure 2:
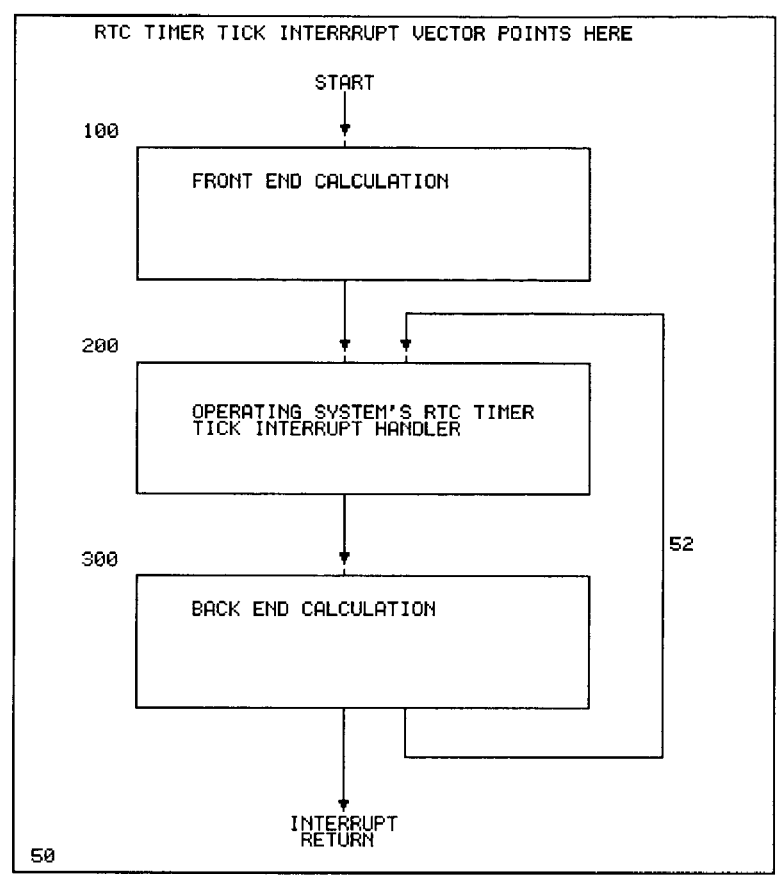
FIG. 2 shows the overall real-time clock (RTC) timer tick interrupt routine of the present invention.

FIG. 2 shows the overall RTC timer tick interrupt routine 50 as performed in accordance with the present invention. Interrupt routine 50 is one of the routines 504 shown in FIG. 5. The overall routine 50 comprises a front-end calculation routine 100, shown in detail in FIG. 3; a core interrupt routine 200; and a back-end calculation routine 300, shown in detail in FIGS. 4 and 4A. The core interrupt routine 200 is the preexisting part of routine 50 that is conventionally executed in response to an RTC interrupt; it is not affected or changed by the present invention. Core interrupt routine 200 increments the operating system (OS) clock 502 by an amount corresponding to the average interval between RTC interrupts. In the embodiment shown, where the RTC frequency is 128 Hz, core interrupt routine 200 increments the OS clock 502 by $\frac{1}{128}$ seconds, or 7.8125 milliseconds (ms), each time it is traversed.

As shown in FIG. 2, the overall interrupt routine 50 of the present invention differs from the core interrupt routine 200 of the prior art by executing the front-end routine 100 before executing the core routine 200 and executing the back-end routine 300 afterward. As described in more detail below, front-end routine 100, in addition to performing certain initialization functions, reads the programmable interval timer to determine the interval of time (deltaTime) that has elapsed since the last RTC interrupt. Back-end routine 300 uses this information to update a count (deltaRem) representing a cumulative interval of time that has elapsed without a corresponding incrementing of the OS clock 502. Based upon this updated count, back-end routine 300 determines whether one or more additional traversals of the core routine 200 (represented in FIG. 2 by a return path 52 from routine 300 to the beginning of routine 200) are necessary to compensate for missed RTC interrupts.

Figure 3:
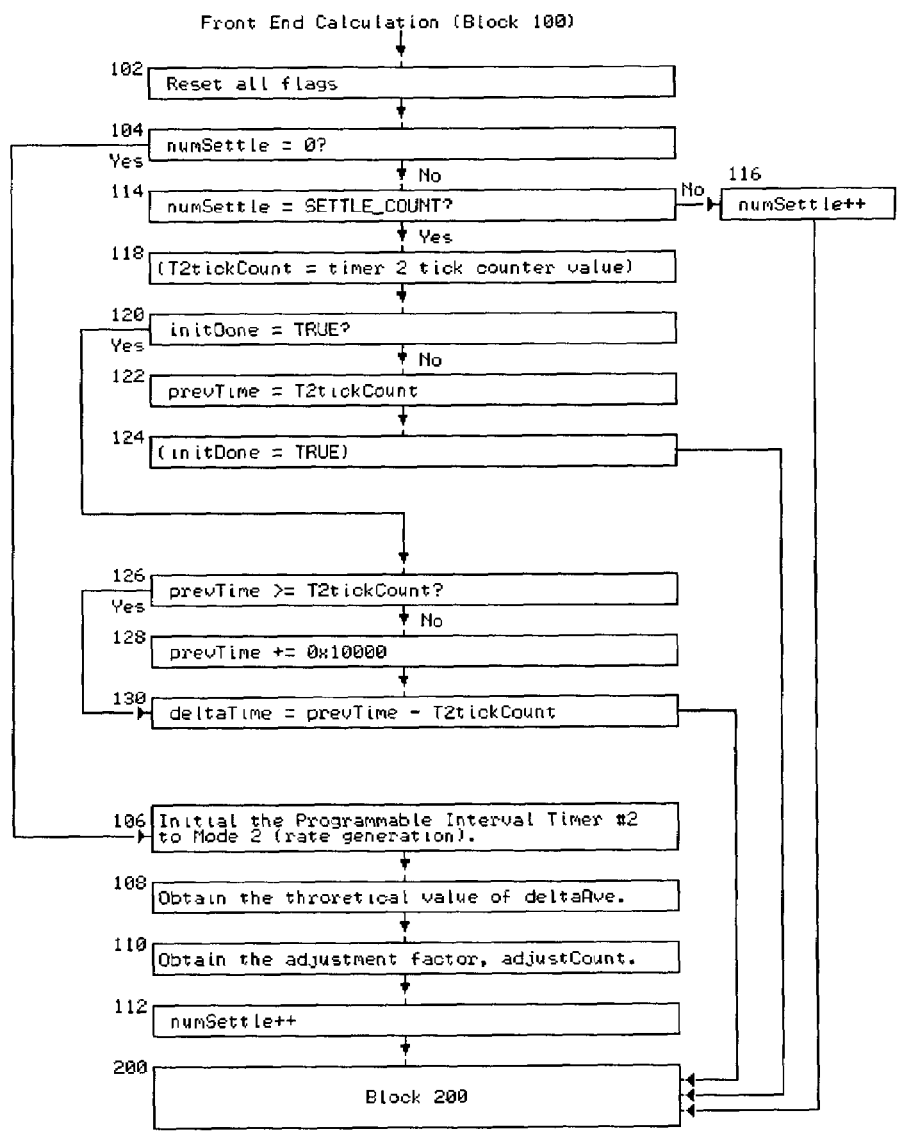
FIG. 3 shows the front-end calculation routine of the present invention.

FIG. 3 shows the details of the front-end calculation routine 100.

On each iteration, the routine 100 initially resets all flags except for the initDone flag to be described, which is initialized only on system startup (step 102). (As used in this description, the term "iteration" refers to any pass though a given routine, whether it is the first such pass or a second or subsequent pass, while the term "reiteration" is reserved for such second or subsequent pass.) The routine 100 then determines, by testing the parameter numSettle, initialized to zero on system startup, whether timer 2 of the programmable interval timer 22 has started yet (step 104).

If at step 104 numSettle is equal to zero, indicating that timer 2 has not started yet, the routine 100 initializes timer 2 of the programmable interval timer 22 to operate in its rate generation mode (mode 2) (step 106). A described above, this is a repetitive count from $2^{16}$ down to one, with auto-reload to $2^{16}$.

Each tick of timer 2 represents a time interval several orders of magnitude less than the timer interval between RTC timer tick interrupts, hence the reference to timer 2 as a high-resolution timer. The exact value of the interval of time between high-resolution timer ticks is unimportant to the operation of the invention. The important notion is that the granularity of time between the high-resolution timer ticks is smaller than the interval of time between RTC timer tick interrupts, as measured under conditions when no DMA controller or other bus master arbitrates for the address and data bus. The smaller the granularity of the high-resolution timer, the better for purposes of the invention. Thus, in the embodiment shown, where the RTC frequency is 128 Hz and the timer 2 frequency is 1.1892 MHz, the interval of time between RTC timer tick interrupts (in the absence of bus contention) is 7.8125 milliseconds (ms), while the interval of time between high-resolution timer ticks is about 840.90 nanoseconds (ns).

The routine 100 then obtains the theoretical value of deltaAve, which is the mathematically calculated number of high-resolution ticks representing the time interval between RTC timer tick interrupts under perfect conditions where no other bus master arbitrates for the bus (step 108). If the interval of time between the RTC timer tick interrupts cannot be resolved to an integral number of high-resolution timer ticks, then an integral number of high-resolution timer ticks is chosen to represent an interval of time slightly larger than, but as close as possible to, the interval of time between RTC timer tick interrupts. Thus, in the present case, where the RTC frequency is 128 Hz and the timer 2 frequency is 1.1892 MHz, there are exactly 9290.625 timer 2 ticks for each RTC tick. Since this number is not an integer, it is rounded up to the nearest integer, 9291. This mathematically calculated number is hard coded into a table (not shown) and fetched by the routine 100 in this step.

The routine 100 then obtains the adjustment factor adjustCount (step 110). This adjustment factor is used since, as in this example, there often cannot be an integral number of high-resolution timer ticks totaling a time interval which would be equal to the time interval between RTC timer tick interrupts. This adjustment factor is hard coded into a table and fetched by the code in this step. The routine 100 then increments the settling time count numSettle (step 112) before passing control to routine 200.

As described below, adjustCount is decremented by one on each traverse of update routine 200, which is traversed an additional time (and adjustCount reset to its initial value) each time adjustCount counts down to zero. As an aid to understanding the calculation of adjustCount, consider the above example in which the timer 2 frequency is 1.1892 MHz and the RTC tick frequency is 128 Hz, so that one RTC tick interval is equal to 9290.625 timer 2 ticks. Assume one of two possibilities: (1) that the tolerances on the RTC physical clock circuit components such as the oscillator have slightly reduced the RTC timer tick rate such that the rate becomes close to or exactly 9291 timer 2 ticks per RTC interrupt; or (2) that the RTC becomes disabled and is taken offline due to a malfunction, or never existed in the system, and as a alternative the RTC function becomes simulated with the aforementioned timer 0, which is driven by the same clock as timer 2. Assuming further, in the event of either possibility, that a rounded value for deltaAve of 9291 is used, then on average the OS clock 502 is incremented every 9291 timer 2 ticks, whereas it theoretically should be incremented on average every 9290.625 timer 2 ticks. After 24,775 such updates, the cumulative lag will be 24,775×0.375=9290.625 timer ticks, or one RTC tick, so that an additional OS clock increment is in order. Setting adjustCount to 9290.625÷(9291−9290.625)=24,775 compensates for the use of a rounded value for deltaAve.

It may be found in practice that a different value of adjustCount, especially a lower value, is required to compensate for other extraneous factors. For example, in the embodiment shown, timer 2 has an upper limit of $2^{16}$ and is thus unable to distinguish between an interval of n timer 2 ticks (where $n<2^{16}$) and an interval of $n+2^{16}m$ ticks (where m is a positive integer). Therefore, if $n+2^{16}m$ timer ticks elapse between successive RTC interrupts (as a result of extended DMA activity, for example), then the front-end routine 100 will interpret the interval as being only n timer ticks in duration, resulting in a corresponding loss of time by OS clock 502. One way to minimize or avoid this problem of timer rollover is to use a timer capable of storing a initial count (e.g., $2^{32}$) that far exceeds any contemplated period of DMA activity. Otherwise, adjustCount may have to be tuned to compensate for this extraneous source of error.

If at step 104 numSettle is not equal to zero, indicating that timer 2 has already started, the routine 100 determines whether it has reached SETTLE_COUNT (step 114). When numSettle has reached this value, the high-resolution timer is deemed reliable to use for the normal operation of the time drift detection and compensation. The value of SETTLE_COUNT is dependent upon the hardware being used to implement the invention and is usually equal to the time required for the timer 2 counter to decrement from $2^{16}$ to one. If numSettle has not reached SETTLE_COUNT, the routine 100 increments numSettle (step 116) before passing control to routine 200.

If at step 114 numSettle has reached SETTLE_COUNT, then the settlement phase is completed, and the routine 100 reads the timer 2 tick count and saves it as T2tickCount (step 118). The routine 100 then tests the flag initDone, initialized to FALSE on system startup, to determine whether initialization is complete, as indicated by a flag value of TRUE (step 120). If not, then the routine 100 sets the variable prevTime equal to the T2tickCount value saved in step 118 on that iteration (step 122) and sets the flag initDone to TRUE to indicate that initialization is complete (step 124) before passing control to routine 200.

On subsequent iterations of routine 100, numSettle will equal SETTLE_COUNT and initDone will equal TRUE, indicating that both the settlement phase and the initialization phase are complete. On such iterations, routine 100 will trace a path in which it the saves the current timer 2 tick count as T2tickCount (step 118) and then determines whether the originally read timer 2 tick count prevTime is equal to or greater than the current timer 2 tick count T2tickCount (step 126). If it is not (i.e., if prevTime<T2tickCount), then the timer 2 counter must have wrapped from a low count to a high count, because the timer 2 counter counts down in this implementation of the invention. The routine 100 adjusts for this wrap by incrementing prevTime by $2^{16}$ (step 128).

Following step 126 and (if performed) step 128, the routine 100 obtains the difference between the previous timer 2 tick count (prevTime) and the current timer 2 tick count (T2tickCount); this difference, which is used in the back-end routine 300, is saved as deltaTime (step 130) before the routine 100 passes control to routine 200.

Figure 4:
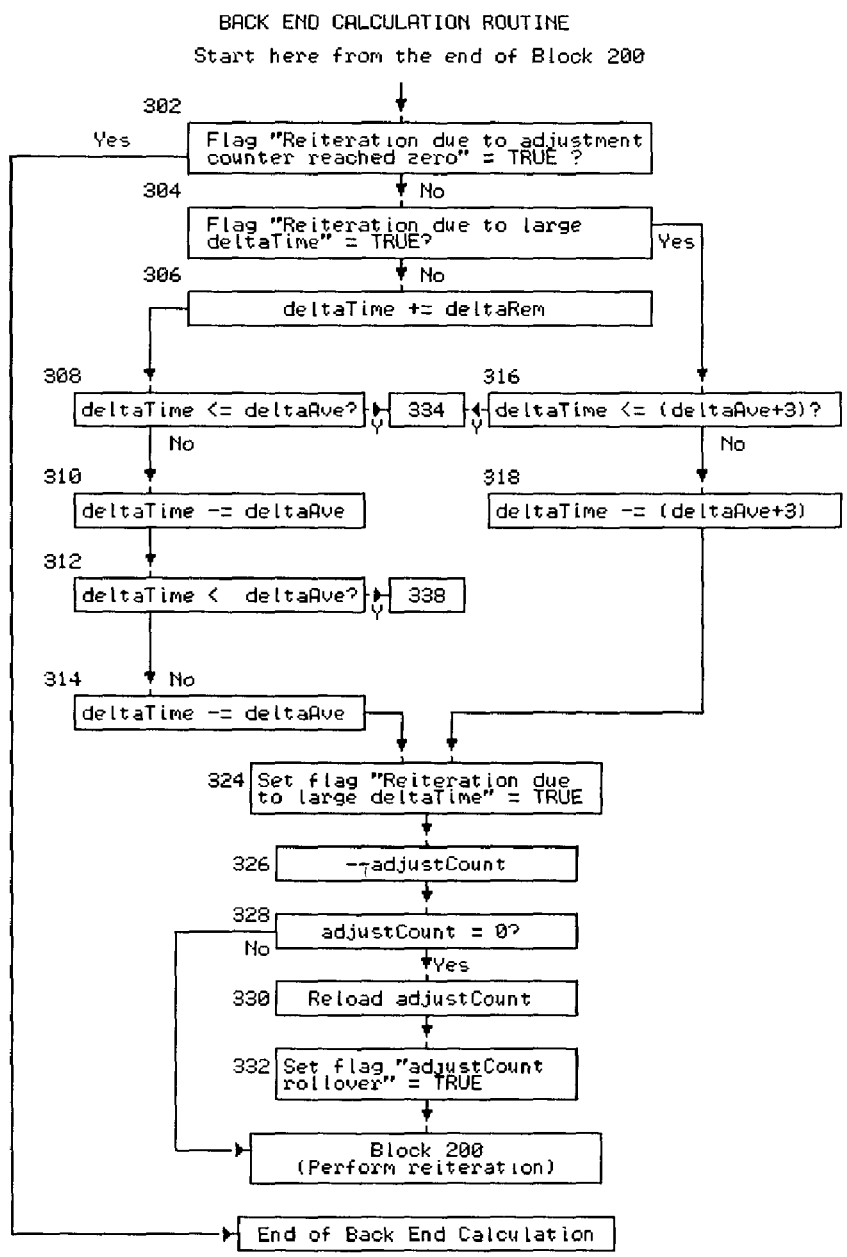
FIGS. 4 and 4A show the back-end calculation routine of the present invention.
Figure 4A:
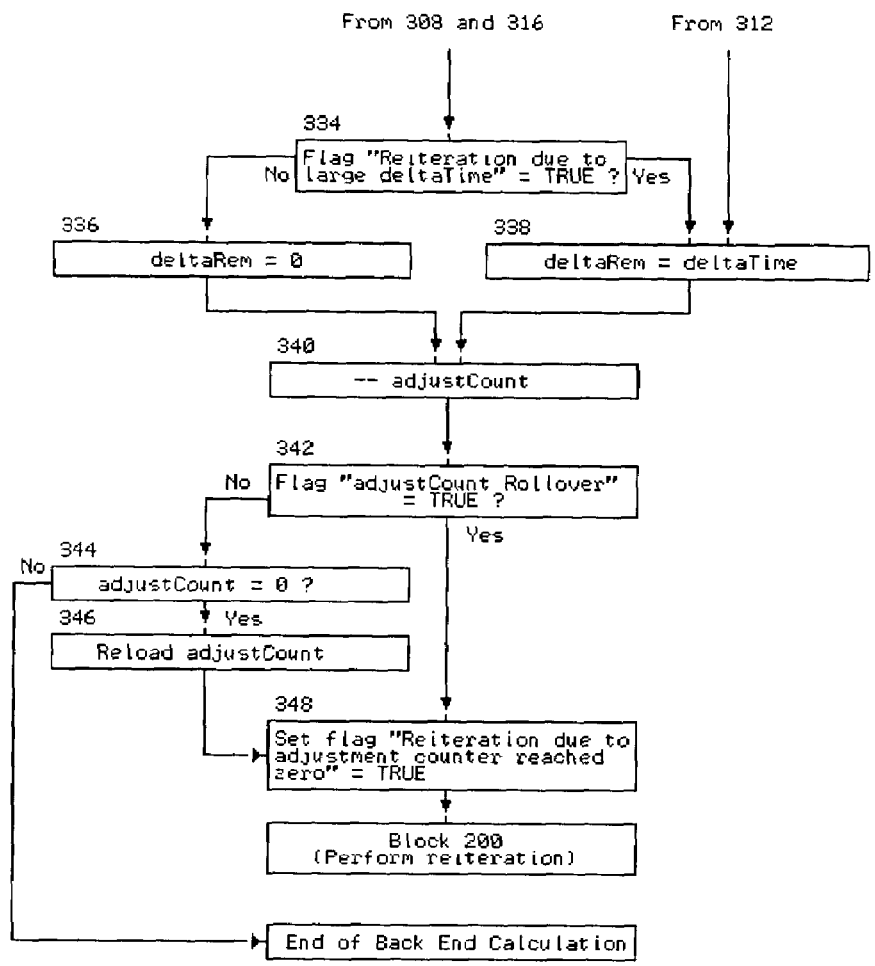

FIGS. 4 and 4A show the details of the back-end calculation routine 300.

At the beginning of each iteration of the back-end calculation routine 300, the routine 300 first determines whether the iteration is a reiteration prompted by the flag "Reiteration due to adjustment counter reaching zero" (step 302). If so, the routine 300 exits to "interrupt return", shown in FIG. 2. Otherwise, the routine 300 determines whether the iteration is a reiteration prompted by the occurrence of a deltaTime greater than the mathematically calculated deltaAve, as indicated by the flag "Reiteration due to large deltaTime" (step 304).

If this iteration of routine 300 is not a reiteration due to either of these causes, then the iteration is the first one for this particular RTC interrupt. If this is the case, then the routine 300 increments deltaTime by the deltaRem value calculated from the previous RTC timer interrupt (step 306). The value deltaRem is a number that is always less than deltaAve and is the value that remains (as a carryover for the next RTC interrupt) after successive subtractions of deltaAve from deltaTime. (The deltaRem value used here in step 306 is later updated to a new value in step 336 or 338.)

After incrementing deltaTime in step 306, the routine 300 determines whether deltaTime is less than or equal to deltaAve (step 308). If so, the routine 300 proceeds to step 334 (FIG. 4A), described below. Otherwise, the routine 300 decrements deltaTime by deltaAve (step 310) and then again determines whether deltaTime is less than deltaAve (step 312). If so, the routine 300 proceeds to step 338 (FIG. 4A), described below. Otherwise, the routine again decrements deltaTime by deltaAve (step 314) before proceeding to step 324.

If at step 304 it is determined that the iteration is a reiteration prompted by the occurrence of a deltaTime greater than the mathematically calculated deltaAve, as indicated by the flag "Reiteration due to large deltaTime", then the routine 300 skips step 306 and proceeds to steps 316 and 318, which are similar to steps 308 and 310, respectively, before proceeding to step 324.

Step 324 is reached on a first pass though back-end routine 300 for a given RTC interrupt after a second decrementing of deltaTime by deltaAve (at step 314) if, after a first decrementing by deltaAve (at step 310), deltaTime is greater than or equal to deltaAve (step 312). Step 324 is also reached on a second or subsequent pass though back-end routine 300 for a given RTC interrupt after a decrementing of deltaTime by deltaAve (at step 318) if, before such decrementing, deltaTime is greater than deltaAve (step 316). At step 324, the routine 300 sets the flag indicating that routine 200 is being reiterated due to a large deltaTime. The routine 300 then decrements adjustCount by 1 (step 326) and determines whether adjustCount is equal to zero (step 328). If not, the routine 300 passes control to routine 200. If at step 328 adjustCount is equal to zero, the routine 300 reloads the location holding this count with the value obtained in step 110 (step 330) and sets the flag "adjustCount rollover" to TRUE (step 332) before passing control to routine 200; when set to TRUE, the flag "adjustCount rollover" indicates that the adjustment counter has been reloaded with the initial value obtained in step 110.

Referring now to FIG. 4A, step 334 is reached if, before any decrementing by deltaAve, deltaTime is less than or equal to deltaAve on a given pass though back-end routine 300 for a given RTC interrupt (step 308 or 316). At step 334 the routine 300 again determines (as it did in step 304) whether the flag "Reiteration due to large deltaTime" has been set to TRUE, indicating that the tick interrupt routine 200 is being reiterated due to the occurrence of deltaTime being greater than the mathematically calculated deltaAve. If this flag has not been set—i.e., if no reiteration of routine 200 has occurred during this RTC timer tick interrupt service—then routine 300 clears the deltaRem value (i.e., sets it to zero) (step 336) and proceeds to step 340, described below. Otherwise, the routine 300 advances to step 338.

Step 338 is reached if, after one decrementing by deltaAve, deltaTime is less than deltaAve for a first pass though back-end routine 300 for a given RTC interrupt (step 312). Step 338 is also reached after step 334 as described above if the flag "Reiteration due to large deltaTime" has been set to TRUE. In step 338, the value of deltaTime, which at this point is less than the value of deltaAve, is saved as deltaRem, to be used during the back-end calculation of the next RTC timer tick interrupt service.

(It will be noted from the above description that the sum deltaRem+deltaTime was saved in step 306 as deltaTime, which was then decremented one or more times and resaved in step 338 as deltaRem. Alternatively, the sum in step 306 could have been saved as deltaRem, and deltaRem could have been the object of the comparison and decrementing operations in steps 308–318, and step 338 omitted. In such an alternative embodiment, deltaRem would consistently represent a cumulative interval of time that has elapsed without a corresponding incrementing of the OS clock, as stated in the broad statement of invention. In the embodiment shown, this cumulative interval of time is represented instead by deltaTime in steps 306–318.)

After step 336 or 338, the back-end calculation routine 300 decrements the adjustment counter, adjustCount, by 1 (step 340), then determines whether the flag "adjustCount rollover" has been set to TRUE (step 342). (This flag is set in step 332 when the variable adjustCount is reset to the original value obtained in step 110.) If it has, then the routine 300 sets the flag "Reiteration due to adjustment counter reached zero" to TRUE (step 348) before passing control to routine 200. This is done so that immediately following the reiteration of step 200, the back-end calculation routine 300 will exit (as shown in step 302).

If at step 342 the flag "adjustCount rollover" has not been set to TRUE, the routine 300 determines whether adjustCount has been decremented to zero (step 344). If it has not, then this is the end of the back-end calculation and routine 300 exits to "interrupt return", shown in FIG. 2. If adjustCount has been decremented to zero, the routine resets adjustCount to the value obtained in step 110 (step 346) before proceeding to step 348.

The operation of interrupt handling routine 50 may be better understood through the use of several examples. For the sake of simplicity, in what follows it will be assumed that deltaAve=10,000 and that the adjustCount operations are not performed.

Assume that deltaRem is initially zero and that, on a first RTC interrupt, front-end routine 100 measures a deltaTime of 24,000. After a first pass though update routine 200, a first pass though routine 300 follows. At the end of step 306 of this first pass, deltaTime is 24,000 (since deltaRem is zero). Because deltaTime is more than twice the size of deltaAve, it is decremented to 14,000 in step 310 and to 4,000 in step 314 of this first pass. Routine 300 then sets the "Reiteration due to large deltaTime" flag to TRUE in step 324, and an additional iteration of update routine 200 is performed. On the second and final pass though routine 300 on the same RTC interrupt, control passes though steps 304, 316, 334 and 338. In the last of these, the current value of deltaTime (4,000) is saved as deltaRem before the routine 50 terminates. At the end of this first interrupt, therefore, OS clock 502 has been incremented twice, an equivalent of 20,000 timer ticks, while deltaRem indicates that 4,000 timer ticks have yet to be accounted for on the OS clock.

Assume now that, on a second RTC interrupt, front-end routine 100 measures a deltaTime of 9,000. After a first pass though update routine 200 and at the end of step 306 of a first pass though routine 300, deltaTime is incremented to 13,000 (since deltaRem is 4,000). Because deltaTime is more than deltaAve but less than twice deltaAve, it is decremented only once to 3,000 in step 310 of this first pass. Since deltaTime is now less than deltaAve, there is no additional pass through either routine 200 or routine 300. Instead, control passes from step 312 to step 338, where the current value of deltaTime (3,000) is saved as deltaRem before the routine 50 terminates. At the end of this second interrupt, OS clock 502 has been incremented three times, an equivalent of 30,000 timer ticks, while deltaRem indicates that 3,000 timer ticks have yet to be accounted for.

Assume finally that, on a third RTC interrupt, front-end routine 100 measures a deltaTime of 7,000. After a first pass though update routine 200 and at the end of step 306 of a first pass though routine 300, deltaTime is incremented to 10,000 (since deltaRem is 3,000). Because deltaTime is less than or equal to deltaAve, it is not decremented at all, and there is no additional pass through routine 200 or routine 300. In this instance, control passes from step 308 through step 334 to step 336, where deltaRem is set to zero before the routine 50 terminates. At the end of this third interrupt, OS clock 502 has been incremented four times, an equivalent of 40,000 timer ticks, while deltaRem indicates that no timer ticks are unaccounted for.

The invention has been described in the context of compensating for clock drift due to bus contention caused by DMA controller activity or the like. However, even in the absence of such contention, the invention would be useful for compensating for other sources of error, such as a slightly slow RTC, as described in the discussion of adjust-Count above.

Various modifications of the embodiment described above will be apparent to those skilled in the art.

What is claimed is:

1. In a computer system having a processor and a program running on the processor, the program having a program clock that is incremented by the processor in response to an interrupt received from a real-time clock, a method of incrementing the program clock, comprising the steps of:
   (a) storing a count representing a cumulative interval of time that has elapsed without a corresponding incrementing of the program clock; and
   (b) in response to an interrupt from the real-time clock:
      (1) incrementing the cumulative interval of time by an actual interval of time that has elapsed since a previous real-time clock interrupt; and
      (2) if the cumulative interval of time is greater than an expected interval of time between real-time clock interrupts, incrementing the program clock and decrementing the cumulative interval of time to reflect incrementing of the program clock.

2. The method of claim 1 in which the steps of incrementing the program clock and decrementing the cumulative interval of time are performed iteratively until the cumulative interval of time is less than the expected interval of time between real-time clock interrupts.

3. The method of claim 1 in which the steps of incrementing the program clock and decrementing the cumulative interval of time are performed unconditionally on a first iteration and are performed conditionally on one or more additional iterations until the cumulative interval of time is less than the expected interval of time between real-time clock interrupts.

4. The method of claim 1 in which the processor transfers control to an interrupt handling routine for performing steps (b)(1) and (b)(2) in response to the interrupt from the real-time clock.

5. The method of claim 1 in which step (b)(1) includes the step of determining the interval of time that has elapsed since the previous real-time clock interrupt.

6. The method of claim 5 in which the step of determining the interval of time that has elapsed since the previous real-time clock interrupt comprises the steps of:
   obtaining a current timer value from a timer having a resolution greater than that of the real-time clock; and
   comparing the current timer value with a timer value obtained from the timer on the previous real-time clock interrupt.

7. The method of claim 1 in which the program clock is further adjusted upon being incremented a predetermined number of times.

8. In a computer system having a processor and a program running on the processor, the program having a program clock that is incremented by the processor in response to an interrupt received from a real-time clock, apparatus for handling an interrupt from the real-time clock to increment the program clock, comprising:
   (a) means for determining an actual interval of time that has elapsed since a previous real-time clock interrupt;
   (b) means for incrementing by said actual interval of time a cumulative interval of time that has elapsed since a previous real-time clock interrupt without a corresponding incrementing of the program clock; and
   (c) means for incrementing the program clock and decrementing the cumulative interval of time to reflect incrementing of the program clock if the cumulative interval of time is greater than an expected interval of time between real-time clock interrupts.

9. The apparatus of claim 8 in which the means for incrementing the program clock and decrementing the cumulative interval of time operates iteratively until the cumulative interval of time is less than the expected interval of time between real-time clock interrupts.

10. The apparatus of claim 8 in which the means for incrementing the program clock and decrementing the cumulative interval of time operates unconditionally on a first iteration and operates conditionally on one or more additional iterations until the cumulative interval of time is less than the expected interval of time between real-time clock interrupts.

11. The apparatus of claim 8 in which means (a)–(c) are part of an interrupt handling routine responsive to the interrupt from the real-time clock.

12. The apparatus of claim 8 in which the means for determining the interval of time that has elapsed since the previous real-time clock interrupt comprises:
   means for obtaining a current timer value from a timer having a resolution greater than that of the real-time clock; and
   means for comparing the current timer value with a timer value obtained from the timer on the previous real-time clock interrupt.

13. The apparatus of claim 8 in which the program clock is further adjusted upon being incremented a predetermined number of times.

14. A program storage device readable by a machine, tangibly embodying a program of instructions executable by the machine to perform method steps for incrementing a program clock in a computer system having a processor and a program running on the processor, the program having a program clock that is incremented by the processor in response to an interrupt received from the real-time clock, the method steps comprising:

(a) storing a count representing a cumulative interval of time that has elapsed without a corresponding incrementing of the program clock; and (b) in response to an interrupt from the real-time clock:
   (1) incrementing the cumulative interval of time by an actual interval of time that has elapsed since a previous real-time clock interrupt; and
   (2) incrementing the program clock and decrementing the cumulative interval of time to reflect incrementing of the program clock if the cumulative interval of time is greater than an expected interval of time between real-time clock interrupts.

15. The program storage device of claim 14 in which the steps of incrementing the program clock and decrementing the cumulative interval of time are performed iteratively until the cumulative interval of time is less than the expected interval of time between real-time clock interrupts.

16. The program storage device of claim 14 in which the steps of incrementing the program clock and decrementing the cumulative interval of time are performed unconditionally on a first iteration and are performed conditionally on one or more additional iterations until the cumulative interval of time is less than the expected interval of time between real-time clock interrupts.

17. The program storage device of claim 14 in which the processor transfers control to an interrupt handling routine for performing steps (b)(1) and (b)(2) in response to the interrupt from the real-time clock.

18. The program storage device of claim 14 in which step (b)(1) includes the step of determining the interval of time that has elapsed since the previous real-time clock interrupt.

19. The program storage device of claim 14 in which the step of determining the interval of time that has elapsed since the previous real-time clock interrupt comprises the steps of:

obtaining a current timer value from a timer having a resolution greater than that of the real-time clock; and comparing the current timer value with a timer value obtained from the timer on the previous real-time clock interrupt.

20. The program storage device of claim 14 in which the program clock is further adjusted upon being incremented a predetermined number of times.

* * * * *